(12) United States Patent
Adachi et al.

(10) Patent No.: US 11,475,172 B2
(45) Date of Patent: Oct. 18, 2022

(54) ADJUSTABLE VIEWING ANGLE FOR A COMPUTER PRIVACY FILTER

(71) Applicant: International Business Machines Corporation, Armonk, NY (US)

(72) Inventors: Yuta Adachi, Koto-Ku (JP); Yohichi Miwa, Yokohama (JP); Yutaka Kawai, Suginami (JP)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 16/354,387

(22) Filed: Mar. 15, 2019

(65) Prior Publication Data
US 2020/0293085 A1 Sep. 17, 2020

(51) Int. Cl.
*G06F 1/16* (2006.01)
*G06F 21/84* (2013.01)
*G02F 1/13* (2006.01)
*G06F 21/62* (2013.01)
*H04W 12/02* (2009.01)

(52) U.S. Cl.
CPC .......... *G06F 21/84* (2013.01); *G02F 1/1323* (2013.01); *G06F 1/1609* (2013.01); *G06F 1/1616* (2013.01); *G06F 1/1637* (2013.01); *G06F 21/6245* (2013.01); *G06F 2221/032* (2013.01); *H04W 12/02* (2013.01)

(58) Field of Classification Search
CPC .... G06F 1/1609; G06F 1/1323; G06F 1/1616; G06F 1/1637; G06F 21/6245; G06F 2221/032; H04W 12/02
See application file for complete search history.

(56) References Cited

U.S. PATENT DOCUMENTS

| 3,740,582 A | * | 6/1973 | McCusker | ............ H02M 1/081 |
| | | | | 310/318 |
| 2006/0044290 A1 | * | 3/2006 | Hurwitz | .................. G06F 21/84 |
| | | | | 345/204 |
| 2009/0242142 A1 | * | 10/2009 | Bellwood | ............... G06F 21/84 |
| | | | | 160/127 |
| 2014/0240344 A1 | | 8/2014 | Tomono | |
| 2016/0334898 A1 | * | 11/2016 | Kwak | .................. H01L 51/5281 |
| 2017/0116425 A1 | | 4/2017 | Chang | |
| 2018/0045863 A1 | | 2/2018 | Bookbinder | |
| 2019/0077152 A1 | * | 3/2019 | Nakao | ..................... H01L 41/09 |
| 2019/0154503 A1 | * | 5/2019 | Yoon | ......................... G01J 3/10 |

FOREIGN PATENT DOCUMENTS

| GB | 2513484 A | * | 10/2014 | ............... E06B 7/08 |
| JP | 2013528205 A | | 7/2013 | |
| JP | 2013541727 A | | 11/2013 | |
| WO | 2018058546 A1 | | 4/2018 | |

* cited by examiner

*Primary Examiner* — Benjamin E Lanier
*Assistant Examiner* — Felicia Farrow
(74) *Attorney, Agent, or Firm* — Alexander G. Jochym

(57) ABSTRACT

A privacy filter includes a plurality of micro louvers. Each micro louver of the plurality of micro louvers is a same size. Each micro louver of the plurality of micro louvers are laid flat on top of each other to form the privacy filter. The plurality of micro louvers includes a first micro louver and a set of micro louvers. The first micro louver is in a fixed position. The set of micro louvers has a first piezo element at a first end of each micro louver and a second piezo element at a second end of each micro louver. The first end is opposite the second end.

15 Claims, 7 Drawing Sheets

ADJUSTABLE VIEWING ANGLE FOR A COMPUTER PRIVACY FILTER

BACKGROUND

The present invention relates generally to the field of computer displays, and more particularly adjusting the viewing angle of a privacy filter for a computer display.

A computer display is an output device that displays information in graphical images. Generally, a computer display comprises the display device, circuitry, casing, and a power supply. In computing, a computer display may be a standalone device (e.g., a computer desktop scenario) or integrated with the computer itself (e.g., a laptop scenario). The display device may be a thin fil transistor liquid crystal display (TFT-LCD) with LED backing, cold-cathode fluorescent lamp (CCFL) backlighting, cathode ray tube (CRT), etc.

A privacy filter for a computer display is a device that can be either integrated into the display itself or placed over the display to reduce the viewing angle of the computer display. Privacy filters can be found in any number of size ranges to fit any number of computer display sizes. Privacy filters include any number of micro louvers that are offset in order to reduce the viewing angle of the computer display.

SUMMARY

Embodiments of the present invention provide for a privacy filter. In one embodiment, the privacy filter includes a plurality of micro louvers. In this embodiment, each micro louver of the plurality of micro louvers is a same size. In this embodiment, each micro louver of the plurality of micro louvers are laid flat on top of each other to form the privacy filter. In this embodiment, the plurality of micro louvers includes a first micro louver and a set of micro louvers. In this embodiment, a first micro louver is in a fixed position. In this embodiment, the set of micro louvers has a first piezo element at a first end of each micro louver and a second piezo element at a second end of each micro louver. In this embodiment, the first end is opposite the second end.

Embodiments of the present invention include a method and computer program product for providing an adjustable privacy filter. In one embodiment, an input is received. The input is a viewing angle. A voltage is determined based on the input.

DETAILED DESCRIPTION

Privacy filters are used to prevent prying eyes of individuals to view or see information being displayed on a computer display. With the increase in size and portability of computing devices (e.g., laptops, mobile devices, etc.), users are utilizing their devices in more public places than ever before. As the computing devices are used in more public places, more people have an opportunity to view and/or take data that they view on another computing device of an individual. Currently, computing devices have the ability to utilize a privacy filter. However, current privacy filters have a set viewing angle based on the arrangement of the micro louvers.

Embodiments of the present invention recognize that a user may want a smaller viewing angle at certain times and a larger viewing angle at other times. Embodiment of the present invention recognize that when a computing device with a privacy filter is used with a large group of people, the only way all of the users can view the computer display is by removing the privacy filter.

Embodiments of the present invention provide for a privacy filter with multiple micro louvers. Embodiments of the present invention provide for applying voltage changes to piezo elements at the ends of the micro louvers to modify the location of the micro louvers relative to each other. Embodiments of the present invention provide for different viewing angles based on the location of the micro louvers due to holes and lines in the micro louvers. Embodiments of the present invention provide for a privacy filter program that receives an input of a viewing angle, determines a voltage to be applied for that viewing angle, and issues a change of that voltage to the circuitry of a computer so that the voltage change is applied to the piezo elements of the micro louvers in order to change the viewing angle.

The present invention will now be described in detail with reference to the Figures.

Figure 1:
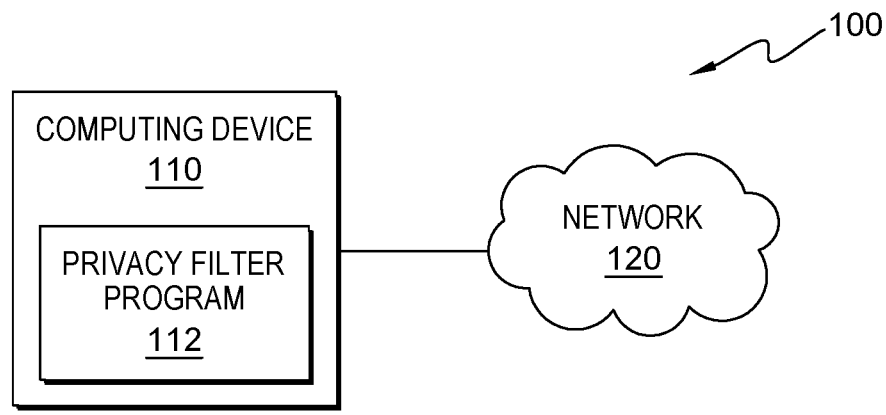
FIG. 1 is a functional block diagram of a network computing environment, generally designated 100, suitable for operation of privacy filter program 112, in accordance with at least one embodiment of the invention.

FIG. 1 is a functional block diagram of a network computing environment, generally designated 100, suitable for operation of privacy filter program 112, in accordance with at least one embodiment of the invention. Network computing environment 100 includes computing device 110 interconnected over network 120. In embodiments of the invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with privacy filter program 112, and other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

Computing device 110 includes a computer display. In an embodiment, a computer display is an output device that displays information in graphical images. Generally, a computer display comprises the display device, circuitry, casing, and a power supply. In an embodiment, the computer display may be a standalone device (e.g., a computer desktop scenario). In an alternative embodiment, the computer display may integrated with computing device 110 (e.g., a laptop scenario). The computer display may be implemented with a thin fil transistor liquid crystal display (TFT-LCD) with LED backing, cold-cathode fluorescent lamp (CCFL) backlighting, cathode ray tube (CRT), or any other display material, known in the art.

Computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

Computing device 110 includes privacy filter program 112. In an embodiment, privacy filter program 112 receives an input from a user via the user interface (not shown). In an embodiment, the received input is the viewing angle of the computer display. In an embodiment, privacy filter program 112 determines the voltage to apply to the piezo element in order to create the viewing angle of the computer display. In an embodiment, privacy filter program 112 issues the change in voltage.

Figure 2:
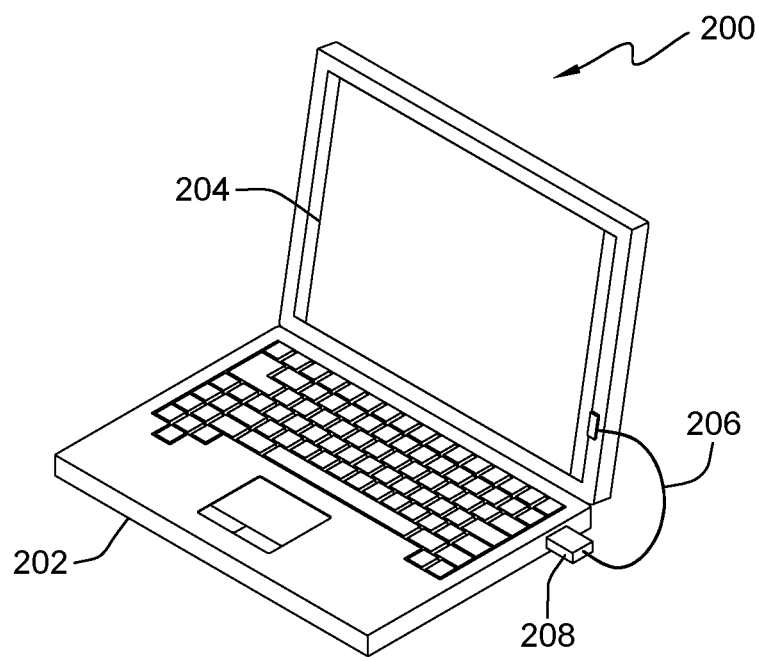
FIG. 2 is an example implementation of a privacy filter, in accordance with at least one embodiment of the invention.

FIG. 2 is an example implementation of privacy filter 204, in accordance with at least one embodiment of the invention. In an embodiment, computing environment 200 includes computing device 202. In an embodiment, computing device 202 is substantially similar to computing device 110 found in FIG. 1. In an embodiment, computing device 202 includes privacy filter 204. In an embodiment, privacy filter 204 includes a plurality of micro louvers (not shown) that are laid flat on top of each other in order to form privacy filter 204.

In a first embodiment, privacy filter 204 is separate from computing device 202. In the first embodiment, privacy filter 204 is placed on top of the computer display of computing device 202 and may be attached by tape, clasps, etc. In the first embodiment, privacy filter 204 may be connected to computing device 202 via wire 206 that connects to adaptor 208. In the first embodiment, adaptor 208 may be connected to USB or any other port on computing device 202 that allows powering of privacy filter 204 and/or communication between privacy filter 204 and computing device 202. In an alternative first embodiment, privacy filter 204 may connected to another power source (not shown) and privacy filter 204 may communicate with computing device 202 via network 120 or any other communication device/protocol (e.g., Bluetooth, etc.)

In a second embodiment, privacy filter 204 may be a physical part of the computer display of computing device 202. In the second embodiment, computing device 202 powers privacy filter 204 via internal circuitry (not shown) of computing device 202. In the second embodiment, computing device 202 communicates with privacy filter 204 via internal circuitry (not shown) of computing device 202.

Figure 3:
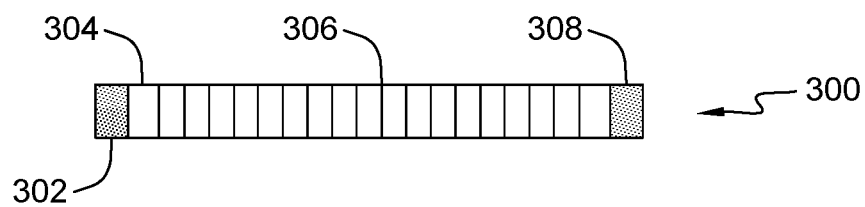
FIG. 3 is a side view depicting a micro louver, in accordance with at least one embodiment of the invention.

FIG. 3 is a side view depicting micro louver 300, in accordance with at least one embodiment of the invention. In an embodiment, micro louver 300 is a rectangular element that allows light to pass at certain points and light is blocked at certain points. In an embodiment, micro louver 300 includes first piezo element 302 located at a first end of micro louver 300 and second piezo element 308 located a second end of micro louver 300. In an embodiment, first piezo element 302 and second piezo element 308 change size based on a voltage applied to each piezo element. In an embodiment, a first voltage is applied to increase the size of first piezo element 302 and a corresponding second voltage is applied to decrease the size of second piezo element 308. In an embodiment, the second end of micro louver 300 is opposite the first end of micro louver 300. In an embodiment, micro louver 300 includes a plurality of windows 304 and lines 306. In an embodiment, window 304 allows visible light to pass through and allows a user to view objects through the window. In an embodiment, window 304 is sized based on the number of windows in the micro louver. For example, if there are five windows, then the size of the window is the size of the micro louver minus the size of the lines and then the remaining size is divided equally between the five windows. In an embodiment, there are five windows 304 in micro louver 300. In an alternative embodiment, there may be any number of windows 304 in micro louver 300. In an embodiment, line 306 does not allow visible light to pass through so that a user cannot view objects through the line. In an embodiment, line 306 is found at predetermined intervals in micro louver 300. In an embodiment, all of the lines are evenly spaced in micro louver 300. In an embodiment, line 306 is any size. In an embodiment, micro louver 300 has one less number of lines 306 than number of windows 304. In an embodiment, each micro louver 300 in the privacy filter is the same size.

Figure 4:
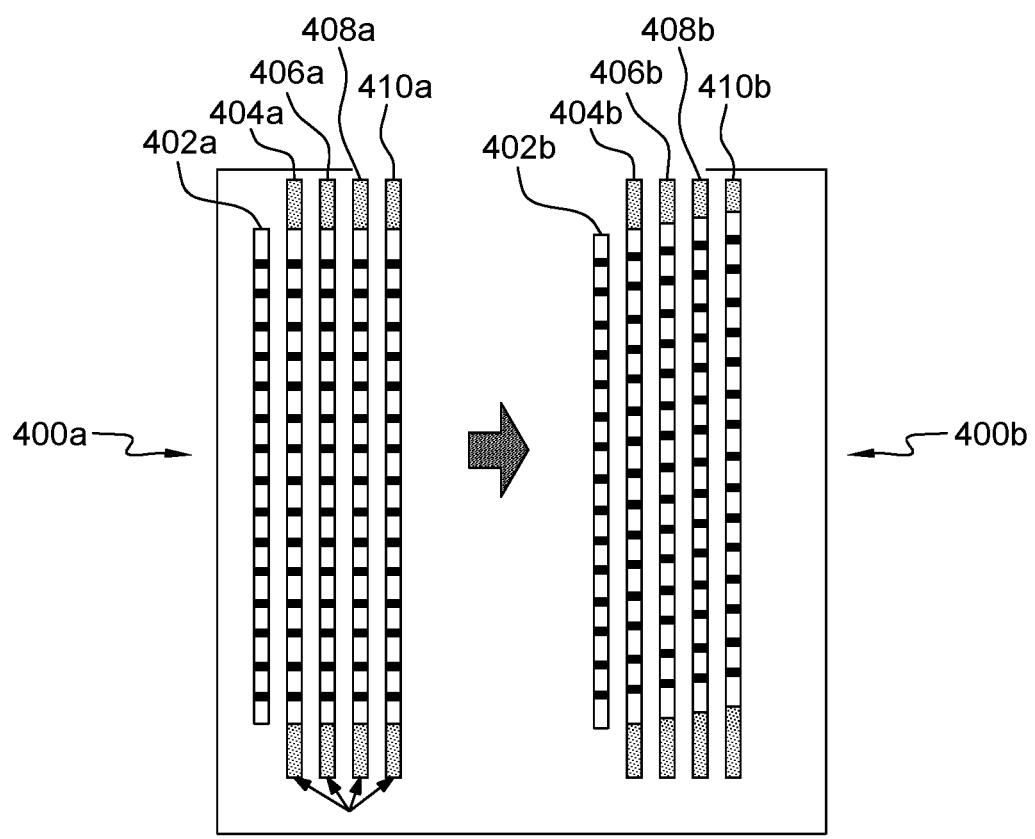
FIG. 4 is a plan view depicting a plurality of micro louvers, in accordance with at least one embodiment of the invention.

FIG. 4 is a plan view depicting a plurality of micro louvers, in accordance with at least one embodiment of the invention. In this embodiment, privacy filter 204 includes five micro louvers 300. In an alternative embodiment, privacy filter 204 may include as few as two micro louvers 300. In yet another alternative embodiment, privacy filter 204 may include any number of micro louvers 300 (e.g., 5, 10, 100, 1000, etc.). In first view 400a, micro louvers 402a, 404a, 406a, 408a, and 410a are all positioned at a first position. In first view 400a, first micro louver 402a is set in a fixed position that does not allow movement from a piezo element because first micro louver 402a does not include a piezo element. In first view 400a, the holes of each of micro louvers 402a, 404a, 406a, 408a, and 410a line up with each other. In other words, visible light can pass between the holes from one side of micro louvers 402a, 404a, 406a, 408a, and 410a to the other side of micro louvers 402a, 404a, 406a, 408a, and 410a. In second view 400b, each of micro louvers 402b, 404b, 406b, 408b, and 410b are set in different positions. Micro louver 402b is still in the same position. In second view 400b, micro louver 404b is offset from micro louver 402b, micro louver 406b is offset from micro louver 404b, micro louver 408b is offset from micro louver 406b, and micro louver 410b is offset from micro louver 408b. In other words, micro louvers 404b, 406b, 408b, and 410b shift relative to first micro louver 402b that is in a fixed position. In this second view, different voltages have been applied to the piezo element of each of micro louvers 404b, 406b, 408b, and 410b. In this second view, the holes of each of micro louvers 402b, 404b, 406b, 408b, and 410b do not line up, and therefore, visible light can pass between the holes from one side of micro louvers 402b, 404b, 406b, 408b, and 410b to the other side of micro louvers 402b, 404b, 406b, 408b, and 410b, however, the angle at which the light can pass is restricted due to the lines found in each of micro louvers 402b, 404b, 406b, 408b, and 410b. In this second view, the lines of each of micro louvers 402b, 404b, 406b, 408b, and 410b are slightly offset. This allows visible light to pass perpendicularly through each of micro louvers 402b, 404b, 406b, 408b, and 410b, and the viewing angle from the sides through each of micro louvers 402b, 404b, 406b, 408b, and 410b is restricted to by the lines of each of the five micro louver 402b, 404b, 406b, 408b, and 410b.

Figure 5:
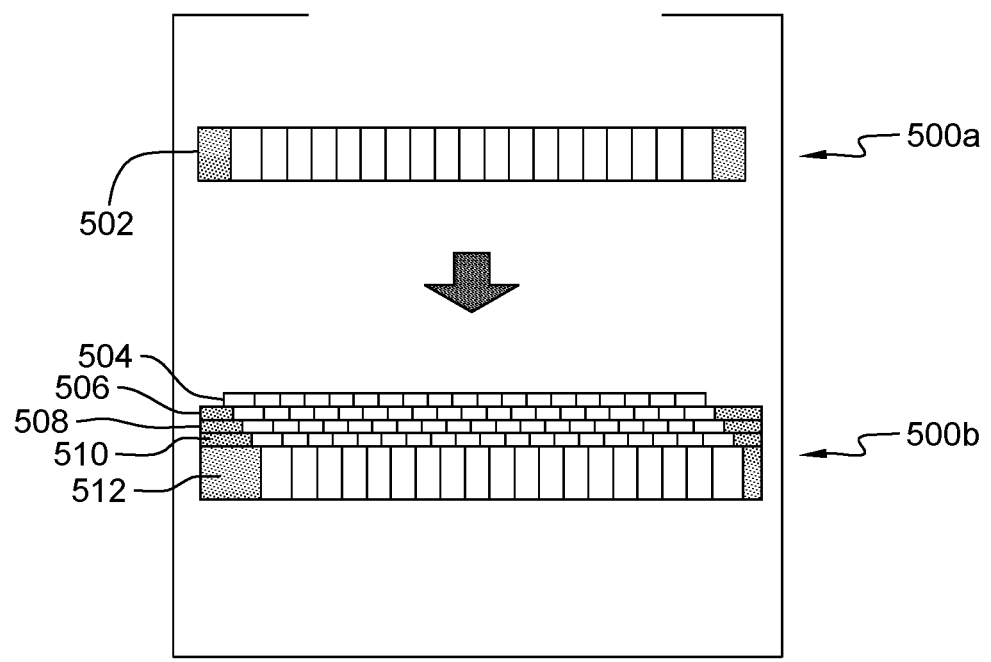
FIG. 5 is a side view depicting a plurality of micro louvers, in accordance with at least one embodiment of the invention.

FIG. 5 is a side view depicting a plurality of micro louvers, in accordance with at least one embodiment of the invention. In a first embodiment, first view 500a is a side view of first view 400a depicted in FIG. 4. In first view 500a, the holes of micro louver 502 and the lines of micro louver 502 match up, as discussed in reference to FIG. 4. In the first embodiment, second view 500b is a side view of second view 400b depicted in FIG. 4. In second view 500b, each of micro louvers 504, 506, 508, 510, and 512 correspond to micro louvers 402b, 404b, 406b, 408b, and 410b, respectively, found in FIG. 4. As shown in FIG. 5, each of the piezo elements of each of micro louvers 506, 508, 510, and 512 have varying sizes which adjusts the positions of each of micro louvers 506, 508, 510, and 512. Therefore, as discussed above in reference to FIG. 4, the holes of each of micro louvers 504, 506, 508, 510, and 512 do not line up, and therefore, visible light can pass between the holes from one side of micro louvers 504, 506, 508, 510, and 512 to the other side of micro louvers 504, 506, 508, 510, and 512, however, the angle at which the light can pass is restricted due to the lines found in each of micro louvers 504, 506, 508, 510, and 512. The position of each of micro louvers 504, 506, 508, 510, and 512 in second view 500b restricts the viewing angle through each of micro louvers 504, 506, 508, 510, and 512.

Figure 6:
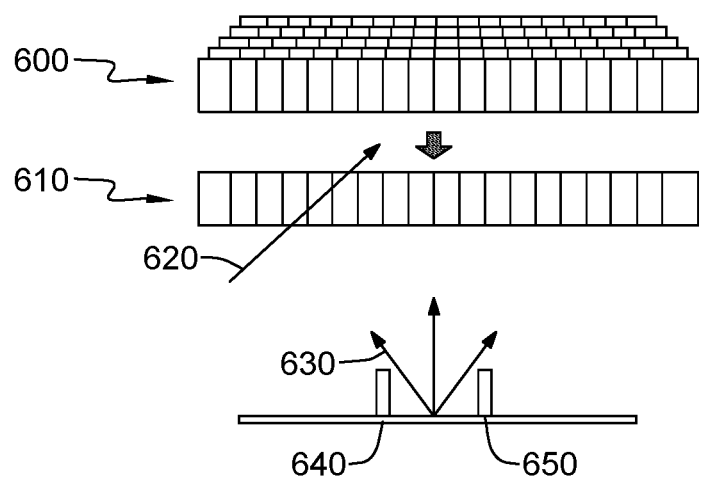
FIG. 6 is a side view depicting a plurality of micro louvers with a first viewing angle, in accordance with at least one embodiment of the invention.

FIG. 6 is a side view depicting a plurality of micro louvers with first viewing angle 630, in accordance with at least one embodiment of the invention. In a first embodiment, first view 600 is similar in view to first view 400a depicted in FIG. 4. In first view 600, the five micro louvers are depicted in the same position as the five micro louvers in first view 400a depicted in FIG. 4 and first view 500a depicted in FIG. 5. In the first embodiment, combined first view 610 depicts the view through the five micro louvers. Arrow 620 shows that visible light can be viewed perpendicularly and at an angle less than or equal to angle 630 through the micro louvers. Arrow 620 is also representative of angle 630 that depicts the angle at which visible light can be viewed through the micro louvers. Visible light cannot be viewed at any greater angle (relative to perpendicular to the front face of the micro louver/privacy filter) because lines 640, 650 restrict viewing. In other words, line 640 is the left most line and line 650 is the right most line that restrict viewing from an angle greater than the angle of arrow 630.

Figure 7:
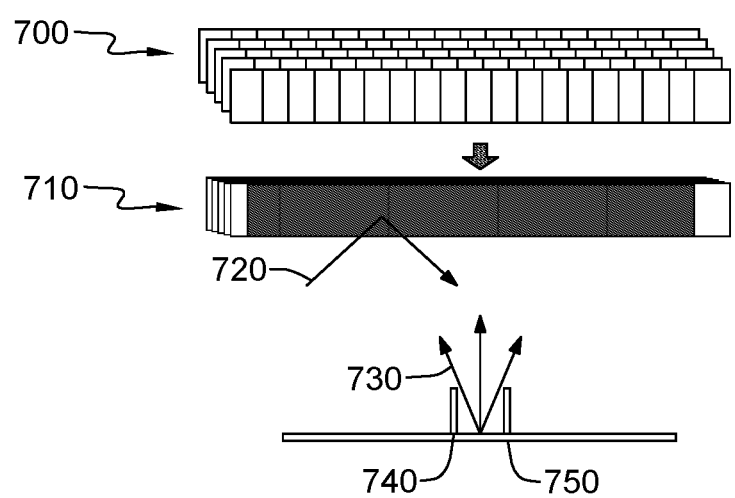
FIG. 7 is a side view depicting a plurality of micro louvers with a second viewing angle, in accordance with at least one embodiment of the invention.

FIG. 7 is a side view depicting a plurality of micro louvers with a second viewing angle, in accordance with at least one embodiment of the invention. In a first embodiment, first view 700 is similar in view to second view 400b depicted in FIG. 4. In first view 700, the five micro louvers are depicted in the same position as the five micro louvers in second view 400b depicted in FIG. 4 and second view 500b depicted in FIG. 5. In the first embodiment, combined first view 710 depicts the view through the five micro louvers. Arrow 720 shows that visible light, while able to be viewed perpendicularly through the micro louvers, cannot be viewed at an angle greater than angle 730. Arrow 720 is also representative of angle 730 that depicts the angle at which visible light can be viewed through the micro louvers. Visible light cannot be viewed at any greater angle (relative to perpendicular to the front face of the micro louver/privacy filter) because line 740, 750 restrict viewing. In other words, line 740 is the left most line and line 750 is the right most line that restricts viewing from an angle greater than the angle of arrow 730. In FIG. 7, the second viewing angle is smaller than the first viewing angle, discussed in FIG. 6. As the five micro louvers are staggered, as shown in FIG. 7, relative to FIG. 6, the width between lines 740, 750 is smaller than the width between lines 640, 650. The staggering of the micro louvers causes a smaller width due to the location of the lines being staggered in the staggered micro louvers and the smaller width causes the second viewing angle to be a smaller viewing angle relative to the first viewing angle. In other words, in FIG. 6, a user can view the screen from a larger angle relative to perpendicular to the front face of the micro louver/privacy filter/computer display as compared to the second viewing angle of FIG. 7, which is a smaller angle relative to perpendicular to the front face of the micro louver/privacy filter/computer display. This allows for more privacy for the computer display in FIG. 7, because users cannot view the computer display in FIG. 7 from an angle as large as a user can view the computer screen in FIG. 6.

Figure 8:
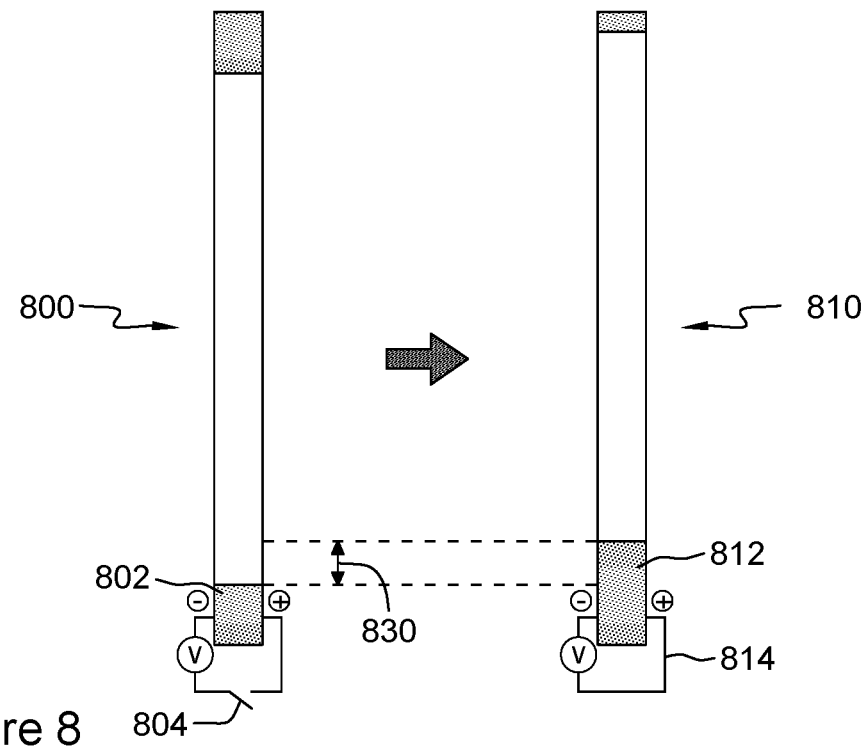
FIG. 8 is a plan view depicting a plurality of micro louvers with different volume displacement of piezo elements due to voltage change, in accordance with at least one embodiment of the invention.

FIG. 8 is a plan view depicting micro louvers with different volume displacements of piezo elements 802, 812 due to voltages 804, 814, in accordance with at least one embodiment of the invention. In an embodiment, first view 800 and second view 810 depict a plan view of a micro louver, substantially similar to micro louver 300 discussed in reference to FIG. 3. In first view 800, the micro louver is sitting in a standard position. In other words, the micro louver in first view 800 is sitting in a position with no voltage being applied, as shown by voltage 804. In first view 800, first piezo element 802 is at a standard size. In the second view, the micro louver is sitting in a voltage applied position. In other words, voltage 814 shows voltage being applied to second piezo element 812. In the second view, the size of second piezo element 812 has increased, as shown by size increase 830, relative to the size of first piezo element 802. In an embodiment, a first voltage is applied to increase the size of first piezo element 802 and a corresponding second voltage is applied (not shown) to decrease the size of second piezo element812 at the opposite end of the micro louver.

Figure 9:
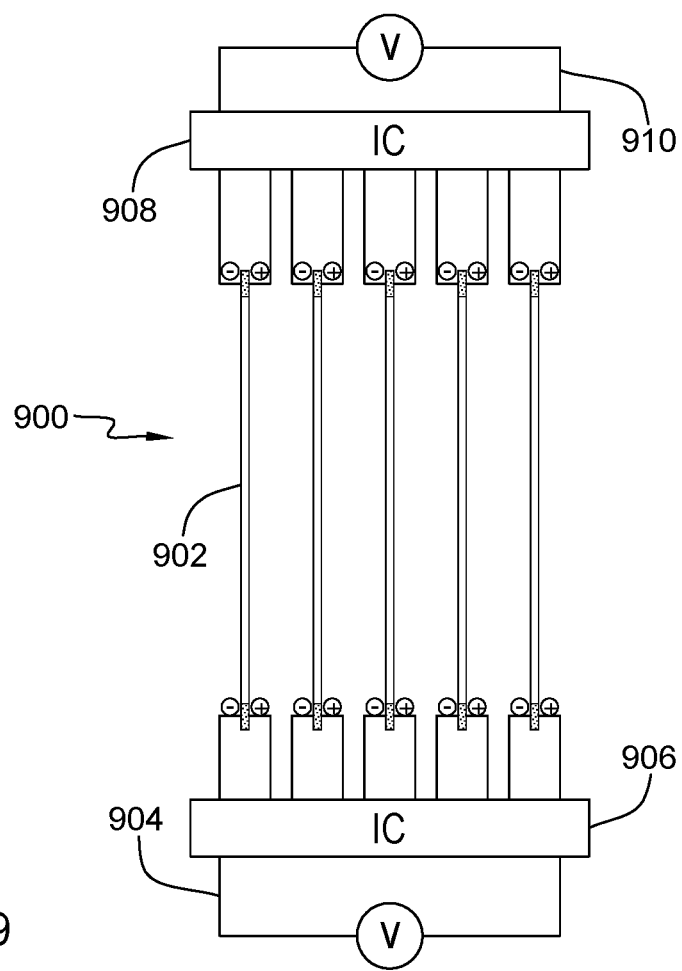
FIG. 9 is a plan view depicting an integrated circuit to control a plurality of micro louvers, in accordance with at least one embodiment of the invention.

FIG. 9 is plan view 900 depicting integrated circuits 906, 908 to control a plurality of micro louvers 902, in accordance with at least one embodiment of the invention. In an embodiment, integrated circuits 906, 908 controls a plurality of micro louvers 902. Voltages 904, 910 are applied to integrated circuits 906, 908, respectively, in order to change the size of the piezo elements of micro louvers 902 to change the viewing angle of the privacy filter, as discussed previously.

Figure 10:
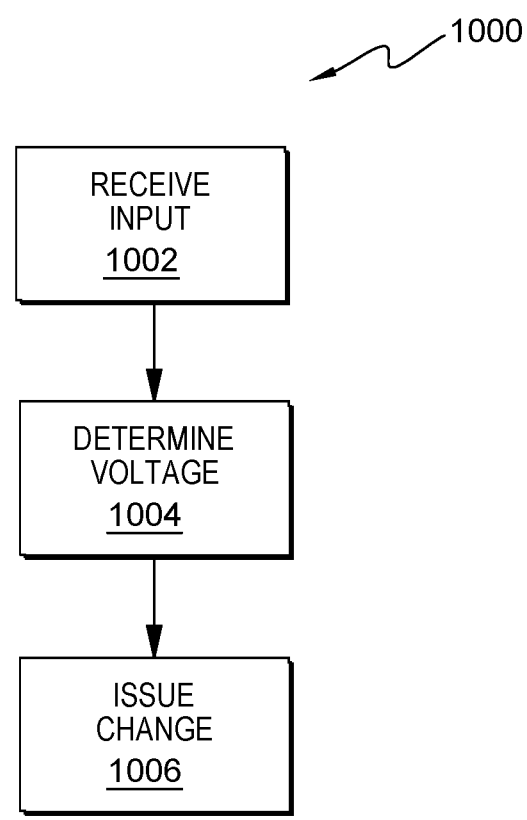
FIG. 10 is a flow chart diagram depicting operational steps for a privacy filter program 112, in accordance with at least one embodiment of the invention.

FIG. 10 is a flow chart diagram depicting operational steps of workflow 1000 for privacy filter program 112 in accordance with at least one embodiment of the invention. In a first embodiment, privacy filter program 112 receives input from a physical switch (not shown) found on privacy filter 204 in FIG. 2. In a second embodiment, privacy filter program 112 receives input from a user interface on computing device 110.

Privacy filter program 112 receives input (step 1002). At step 1002, privacy filter program receives an input of the viewing angle to be displayed on the privacy filter. In an embodiment, the viewing angle can be in degrees.

Privacy filter program 112 determines voltage (step 1004). At step 1004, privacy filter program 112 determines the proper voltage to be applied to each of the plurality of micro louvers in privacy filter 204 in order to provide the received viewing angle in the input.

Privacy filter program 112 issues change (step 1006). At step 1006, privacy filter program 112 issues a change to the controlling circuitry that controls the voltage applied to the piezo element of each of the plurality of micro louvers. The issued change is in the form of the voltage to be applied to the piezo element of each of the plurality of micro louvers. In an embodiment, privacy filter program 112 may issue the change to the operating system or firmware of computing device 110 in order to transmit the voltage to be applied to the piezo element of each of the plurality of micro louvers.

Figure 11:
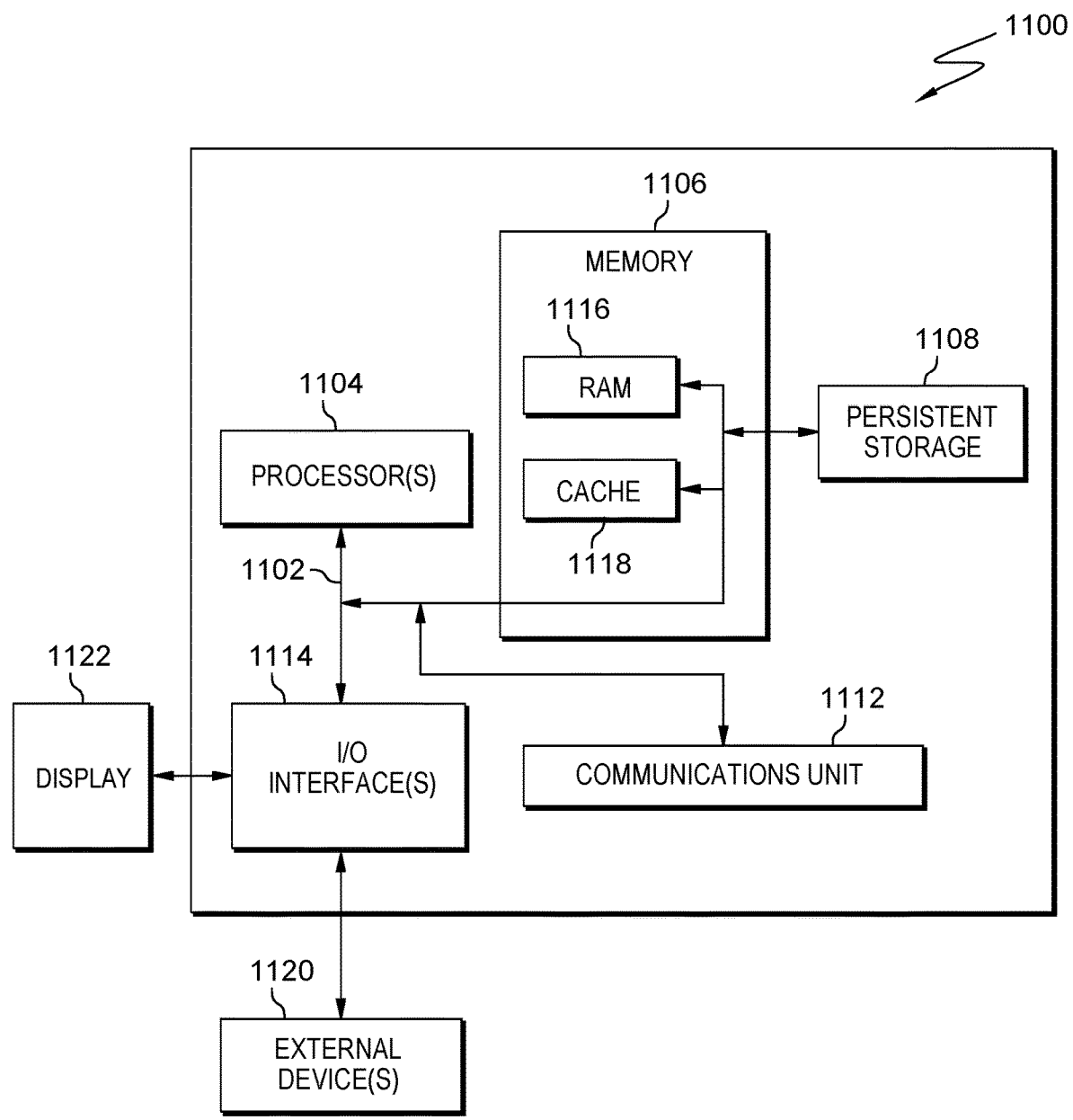
FIG. 11 is a block diagram depicting components of a computer, generally designated 1100, suitable for executing privacy filter program 112, in accordance with at least one embodiment of the invention.

FIG. 11 is a block diagram depicting components of a computer 1100 suitable for privacy filter program 112, in accordance with at least one embodiment of the invention. FIG. 11 displays the computer 1100, one or more processor(s) 1104 (including one or more computer processors), a communications fabric 1102, a memory 1106 including, a RAM 1116, and a cache 1118, a persistent storage 1108, a communications unit 1112, I/O interfaces 1114, a display 1122, and external devices 1120. It should be appreciated that FIG. 11 provides only an illustration of one embodiment and does not imply any limitations with regard to the environments in which different embodiments may be implemented. Many modifications to the depicted environment may be made.

As depicted, the computer 1100 operates over the communications fabric 1102, which provides communications between the computer processor(s) 1104, memory 1106, persistent storage 1108, communications unit 1112, and input/output (I/O) interface(s) 1114. The communications fabric 1102 may be implemented with an architecture suitable for passing data or control information between the processors 1104 (e.g., microprocessors, communications processors, and network processors), the memory 1106, the external devices 1120, and any other hardware components within a system. For example, the communications fabric 1102 may be implemented with one or more buses.

The memory 1106 and persistent storage 1108 are computer readable storage media. In the depicted embodiment, the memory 1106 comprises a random-access memory (RAM) 1116 and a cache 1118. In general, the memory 1106 may comprise any suitable volatile or non-volatile one or more computer readable storage media.

Program instructions for privacy filter program 112 may be stored in the persistent storage 1108, or more generally, any computer readable storage media, for execution by one or more of the respective computer processors 1104 via one or more memories of the memory 1106. The persistent storage 1108 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 1108 may also be removable. For example, a removable hard drive may be used for persistent storage 1108. Other examples include optical and magnetic disks, thumb drives, and smart cards that are inserted into a drive for transfer onto another computer readable storage medium that is also part of the persistent storage 1108.

The communications unit 1112, in these examples, provides for communications with other data processing systems or devices. In these examples, the communications unit 1112 may comprise one or more network interface cards. The communications unit 1112 may provide communications through the use of either or both physical and wireless communications links. In the context of some embodiments of the present invention, the source of the various input data may be physically remote to the computer 1100 such that the input data may be received, and the output similarly transmitted via the communications unit 1112.

The I/O interface(s) 1114 allow for input and output of data with other devices that may operate in conjunction with the computer 1100. For example, the I/O interface 1114 may provide a connection to the external devices 1120, which may be as a keyboard, keypad, a touch screen, or other suitable input devices. External devices 1120 may also include portable computer readable storage media, for example thumb drives, portable optical or magnetic disks, and memory cards. Software and data used to practice embodiments of the present invention may be stored on such portable computer readable storage media and may be loaded onto the persistent storage 1108 via the I/O interface(s) 1114. The I/O interface(s) 1114 may similarly connect to a display 1122. The display 1122 provides a mechanism to display data to a user and may be, for example, a computer monitor.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A privacy filter, the privacy filter comprising:
a plurality of micro louvers, wherein each micro louver of the plurality of micro louvers are a same size, and wherein each micro louver of the plurality of micro louvers are laid flat on top of each other to form the privacy filter, and wherein the plurality of micro louvers includes a first micro louver and a set of micro louvers;
wherein the first micro louver is in a fixed position;
wherein each micro louver of the set of micro louvers has a separate piezo element, and each micro louver of the set of micro louvers has a first piezo element at a first end of each micro louver of the set of micro louvers and a second piezo element at a second end of each micro louver of the set of micro louvers, wherein the first end is opposite the second end, wherein each micro louver of the plurality of micro louvers includes a plurality of holes and a plurality of lines between the first piezo element and the second piezo element.

2. The privacy filter of claim 1, further comprising:
wherein each line of the plurality of lines is between each hole of the plurality of holes.

3. The privacy filter of claim 2, further comprising:
wherein each line of the plurality of lines is evenly spaced between the first end and the second end of each micro louver.

4. The privacy filter of claim 1, further comprising:
wherein each first piezo element increases in size in response to a first voltage and each corresponding second piezo element decreases in size in response to a second voltage.

5. The privacy filter of claim 4, further comprising:
wherein when the first voltage and the second voltage are applied, each micro louver of the set of micro louvers shifts position relative to the first micro louver.

6. The privacy filter of claim 4, further comprising:
wherein the first voltage and the second voltage applied to each micro louver of the set of micro louvers is different.

7. The privacy filter of claim 1, further comprising:
wherein the privacy filter is integrated into a computer display, and wherein the privacy filter communicates with the computer display, and wherein the privacy filter receives power from the computer display.

8. The privacy filter of claim 1, further comprising:
a first integrated circuit, wherein the first integrated circuit is connected to each first piezo element; and
a second integrated circuit, wherein the second integrated circuit is connected to each second piezo element.

9. The privacy filter of claim 8, further comprising:
wherein a first voltage is applied to the first integrated circuit, and wherein the first integrated circuit applies a plurality of voltages to each first piezo element in response to the first voltage; and
wherein a second voltage is applied to the second integrated circuit, and wherein the second integrated circuit applies a plurality of voltages to each second piezo element in response to the second voltage.

10. The privacy filter of claim 1, further comprising:
a power supply; and
an adaptor, wherein the adaptor allows connectivity between the privacy filter and a computing device.

11. The privacy filter of claim of claim 1, wherein the plurality of micro louvers includes five micro louvers.

12. A method for an adjustable privacy filter, the method comprising:
receiving, by one or more computer processors, an input, wherein the input is a viewing angle;
determining, by one or more computer processors, a voltage based on the input; and
applying, by one or more computer processors, the voltage to a privacy filter,
wherein the privacy filter includes a plurality of micro louvers, wherein each micro louver of the plurality of micro louvers are a same size, and wherein each micro louver of the plurality of micro louvers are laid flat on top of each other to form the privacy filter, and wherein the plurality of micro louvers includes a first micro louver and a set of micro louvers;
wherein the first micro louver is in a fixed position;
wherein each micro louver of the set of micro louvers has a separate piezo element, and each micro louver of the set of micro louvers has a first piezo element at a first end of each micro louver of the set of micro louvers and a second piezo element at a second end of each micro louver of the set of micro louvers, wherein the first end is opposite the second end, wherein each micro louver of the plurality of micro louvers includes a plurality of holes and a plurality of lines between the first piezo element and the second piezo element.

13. The method of claim 12, wherein the privacy filter is integrated into a computer display.

14. A computer program product for an adjustable privacy filter, the computer program product comprising:
one or more computer readable storage media; and
program instructions stored on the one or more computer readable storage medium, the program instructions comprising:
program instructions to receive an input, wherein the input is a viewing angle;
program instructions to determine a voltage based on the input; and
program instructions to apply the voltage to a privacy filter,
wherein the privacy filter includes a plurality of micro louvers, wherein each micro louver of the plurality of micro louvers are a same size, and wherein each micro louver of the plurality of micro louvers are laid flat on top of each other to form the privacy filter, and wherein the plurality of micro louvers includes a first micro louver and a set of micro louvers;
wherein the first micro louver is in a fixed position;
wherein each micro louver of the set of micro louvers has a separate piezo element, and each micro louver of the set of micro louvers has a first piezo element at a first end of each micro louver of the set of micro louvers and a second piezo element at a second end of each micro louver of the set of micro louvers, wherein the first end is opposite the second end, wherein each micro louver of the plurality of micro louvers includes a plurality of holes and a plurality of lines between the first piezo element and the second piezo element.

15. The computer program product of claim 14, wherein the privacy filter is integrated into a computer display.

* * * * *